US010476741B2

(12) United States Patent
Hallivuori et al.

(10) Patent No.: US 10,476,741 B2
(45) Date of Patent: Nov. 12, 2019

(54) METHOD AND AN APPLIANCE FOR MAINTAINING A CONFIGURATION DATA STRUCTURE

(71) Applicant: CORIANT OY, Espoo (FI)

(72) Inventors: Ville Hallivuori, Espoo (FI); Matti Hallivuori, Espoo (FI); Juha Hopsu, Espoo (FI)

(73) Assignee: Coriant Oy, Espoo (FI)

( * ) Notice: Subject to any disclaimer, the term of this patent is extended or adjusted under 35 U.S.C. 154(b) by 185 days.

(21) Appl. No.: 15/550,524

(22) PCT Filed: Feb. 12, 2015

(86) PCT No.: PCT/FI2015/050085
§ 371 (c)(1),
(2) Date: Aug. 11, 2017

(87) PCT Pub. No.: WO2016/128606
PCT Pub. Date: Aug. 18, 2016

(65) Prior Publication Data
US 2018/0041385 A1 Feb. 8, 2018

(51) Int. Cl.
*H04L 12/24* (2006.01)
(52) U.S. Cl.
CPC .......... *H04L 41/082* (2013.01); *H04L 41/085* (2013.01); *H04L 41/0813* (2013.01); *H04L 41/0866* (2013.01); *Y04S 40/162* (2013.01)
(58) Field of Classification Search
None
See application file for complete search history.

(56) References Cited

U.S. PATENT DOCUMENTS 7,376,719 B1* 5/2008 Shafer ................ H04L 41/082
709/203
9,621,420 B2* 4/2017 Bradley ............ H04L 41/0813
(Continued)

FOREIGN PATENT DOCUMENTS

EP 2804344 A1 11/2014

OTHER PUBLICATIONS

International Search Report, dated Oct. 20, 2015, from corresponding PCT application No. PCT/FI2015/050085.

*Primary Examiner* — Joshua Joo
(74) *Attorney, Agent, or Firm* — Young & Thompson

(57) ABSTRACT

Disclosed is a device for maintaining a configuration data structure expressing configuration of a device. The configuration is maintained by an operative process making desired changes to the configuration and adding, to the configuration data structure, change descriptors indicative of the changes. When the configuration data structure is updated, an auxiliary process is run in parallel with the operative process. The auxiliary process includes requesting functional entities of the device to report their configurations prevailing at an update time instant, and constructing an auxiliary configuration data structure on the basis of the reported information. The configuration data structure is updated by replacing a portion of the configuration data structure corresponding to the update time instant with the auxiliary configuration data structure. There is no need to freeze the configuration during the update because the auxiliary process is run in parallel with the operative process.

18 Claims, 3 Drawing Sheets

(56) References Cited

U.S. PATENT DOCUMENTS

2007/0067351 A1    3/2007  Singh et al.
2014/0047085 A1*   2/2014  Peters .................... G06F 9/541
                                                       709/221

* cited by examiner

METHOD AND AN APPLIANCE FOR MAINTAINING A CONFIGURATION DATA STRUCTURE

FIELD OF THE DISCLOSURE

The disclosure relates to a method and to an appliance for maintaining a configuration data structure expressing configuration of a device that can be, for example but not necessarily, a network element of a data transfer network. Furthermore, the disclosure relates to a computer program for maintaining a configuration data structure and to a network element.

BACKGROUND

In conjunction with many devices, such as e.g. network elements of a data transfer network, there is a need to maintain a configuration data structure which expresses an up-to-date configuration the device. In a case where the device is a network element, the configuration data structure may express for example the configurations of e.g. shapers, schedulers, egress ports, ingress ports, forwarding tables, access control lists, routing protocol parameters, border gateway protocol "BGP" peers, software implemented processes, and/or other physical entities and/or immaterial entities of the network element. The network element can be for example an Internet Protocol "IP" router, an Ethernet switch, a multiprotocol label switching "MPLS" switch, a network element for a software defined network "SDN", an Asynchronous Transfer Mode "ATM" switch, and/or a packet optical switch.

A traditional way to maintain the above-mentioned configuration data structure is to add incremental change descriptors indicative of changes of the configuration to the configuration data structure and to update the whole configuration data structure to correspond to the prevailing configuration in response to a need to update the configuration data structure. The need to update the configuration data structure may take place for example when the amount of the change descriptors reaches a pre-determined limit, i.e. the list of the change descriptors becomes inconveniently long. The configuration data structure can be updated by requesting functional entities of the device to report their configurations and by re-constructing the configuration data structure on the basis of the information reported by the functional entities. An inconvenience related to this approach is that changes cannot be made to the configuration during the above-described update process, and thus the configuration has to be frozen during the update process.

Another known way to maintain the above-mentioned configuration data structure is to maintain a model of the device so that the configuration of the model is all the time an exact copy of the configuration of the device. In this case, an auxiliary configuration data structure that corresponds to a desired time instant can be constructed off-line with the aid of the model and the configuration data structure can be updated on the basis of the auxiliary configuration data structure and the change descriptors related to changes made to the configuration after the above-mentioned time instant. An inconvenience related to this approach is that maintaining the model consumes resources of the device because in many cases the model is quite complex since the functional entities of the device have to be modelled in a sufficiently detailed way.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new appliance for maintaining a configuration data structure expressing configuration of a device, e.g. a network element.

An appliance according to the invention comprises a processing system for running an operative process that comprises making desired changes to the configuration of the device and adding, to the configuration data structure, change descriptors indicative of the changes. The processing system is further configured to:

run, in response to a need to update the configuration data structure, an auxiliary process in parallel with the operative process, and update the configuration data structure by replacing a portion of the configuration data structure corresponding to an update time instant with an auxiliary configuration data structure constructed by the auxiliary process, the updated configuration data structure comprising the auxiliary configuration data structure and the change descriptors indicative of the changes made after the update time instant.

The above-mentioned auxiliary process comprises:

requesting one or more functional entities of the device to report configurations of the functional entities prevailing at the update time instant, each change made after the update time instant to the configuration being implemented by the operative process so that data defining the configuration prevailing at the update time instant remains available to the auxiliary process, and constructing the auxiliary configuration data structure at least partly on the basis of the information reported by the functional entities.

As the auxiliary process is run in parallel with the above-mentioned operative process, there is no need to freeze the configuration when the update is done. On the other hand, there is no need to maintain a detailed model of the functional entities of the device because the initial state of the auxiliary process can be for example a snap-shot copy of the state of the operative process.

In accordance with the invention, there is provided also a new network element than can be for example an Internet Protocol "IP" router, an Ethernet switch, a multiprotocol label switching "MPLS" switch, a network element of a software defined network "SDN", a packet optical switch, and/or an Asynchronous Transfer Mode "ATM" switch. A network element according to the invention comprises:

one or more functional entities for controlling and carrying out data transfer between the network element and a data transfer network, and a processing system communicatively connected to the one or more functional entities.

The processing system of the network element is configured to constitute an appliance according to the invention for maintaining a configuration data structure expressing configuration of the network element.

In accordance with the invention, there is provided also a new method for maintaining a configuration data structure expressing configuration of a device. A method according to the invention comprises:

running an operative process that comprises making desired changes to the configuration of the device and adding, to the configuration data structure, change descriptors indicative of the changes, running, in response to a need to update the configuration data structure, the above-described auxiliary process in parallel with the operative process, and updating the configuration data structure by replacing a portion of the configuration data structure corresponding to an update time instant with the auxiliary configuration data structure constructed by the auxiliary process.

In accordance with the invention, there is provided also a new computer program for maintaining a configuration data structure expressing configuration of a device. A computer program according to the invention comprises computer executable instructions for controlling a programmable processing system to:

run an operative process that comprises making changes to the configuration of the device and adding, to the configuration data structure, change descriptors indicative of the changes, run, in response to a need to update the configuration data structure, the above-described auxiliary process in parallel with the operative process, and update the configuration data structure by replacing a portion of the configuration data structure corresponding to the update time instant with the auxiliary configuration data structure constructed by the auxiliary process.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING EMBODIMENTS

Figure 1:
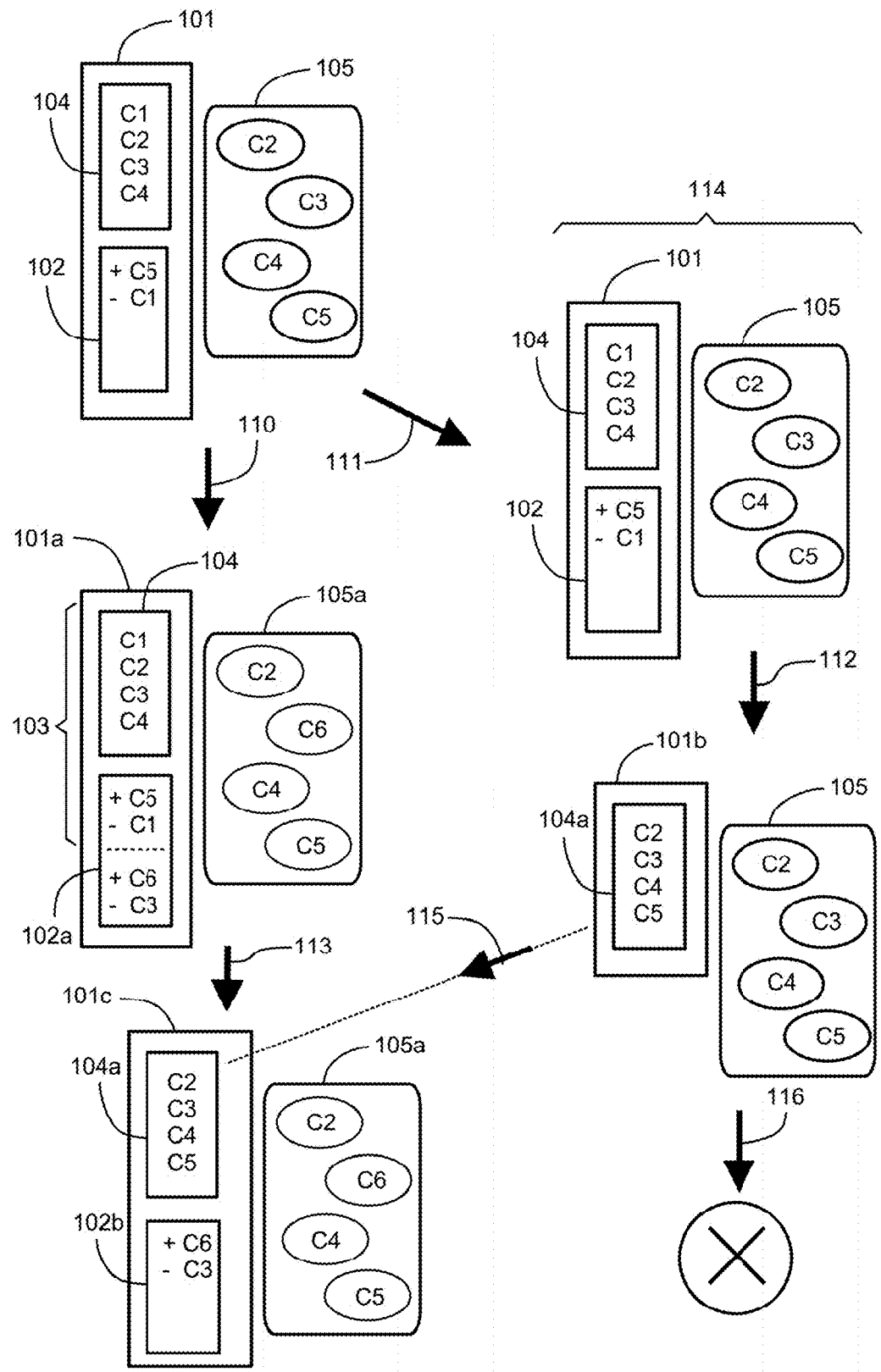
FIG. 1 illustrates an update process of an exemplifying configuration data structure, the update process being a part of a method according to an exemplifying and non-limiting embodiment of the invention.

FIG. 1 illustrates an update process of an exemplifying configuration data structure 101. The configuration data structure 101 expresses an up-to-date configuration of one or more functional entities of a device that can be, for example but not necessarily, a network element of a data transfer network. Each functional entity can be a physical entity or an immaterial entity such as e.g. a software implemented process. In FIG. 1, the configuration of the device in different situations is depicted with blocks denoted with reference numbers 105 and 105a. For example, the configuration 105 is "C2, C3, C4, C5". The configuration data structure 101 comprises a base portion 104 and one or more change descriptors 102 which express how the configuration has been changed with respect to the configuration corresponding to the base portion. The data entity constituted by the change descriptors 102 is sometimes called "a journal" or "a delta log". Each of the change descriptors expresses a change made to the configuration. For example, the configuration 105 "C2, C3, C4, C5" is expressed by the base portion 104 and the change descriptors 102 so that the base portion 104 corresponds to configuration "C1, C2, C3, C4" and the change descriptor +C5 expresses that a configuration item C5 has been added to the configuration expressed by the base portion 104 and the change descriptor −C1 expresses that a configuration item C1 has been removed from the configuration expressed by the base portion 104.

It is to be noted that the above-described example is a strongly simplified case for merely illustrating the principled relationships between the configuration 105, the base portion 104, and the change descriptors 102. The above-presented simplified example case could lead to an impression that it is straightforward to modify the base portion so that the modified base portion alone corresponds to the prevailing configuration but in practice it is, however, cumbersome or even impossible to modify the base portion merely on the basis of the prevailing base portion and the change descriptors so that the modified base portion alone corresponds to the prevailing configuration. Therefore, there is typically a need to request the functional entities to report their prevailing configurations in order to be able to update the configuration data structure 101 so that the base portion is modified to correspond to the earlier base portion and the change descriptors. A need to update the configuration data structure 101 in the way described above may take place for example when the amount of the change descriptors 102 reaches a pre-determined limit, i.e. the list of the change descriptors 102 becomes inconveniently long.

When there is a need to update the configuration data structure 101 in the way described above, an auxiliary process can be started by forming a copy 114, or a sufficient partial copy, of a momentary state of an operative process which, if needed, modifies the configuration 105 and adds corresponding change descriptors to the configuration data structure 101. In many cases, the operative process is controlled for example by a network management system "NMS". The operative process is actually forked into two branches so that one of the branches represents continuation of the operative process controlled e.g. by the network management system and the other one of the branches represents the auxiliary process. In FIG. 1, the forking of the operative process is depicted with an arrow 111 and the progress of the operative process after the forking action is depicted with an arrow 110. In the exemplifying case illustrated in FIG. 1, the operative process comprises changing the configuration 105 so that a configuration item C6 is added and a configuration item C3 is removed in accordance e.g. control messages received from the network management system. Correspondingly, change descriptors +C6 and −C3 are added to the list of the change descriptors. The changed configuration is denoted with a reference number 105a, the changed configuration data structure is denoted with a reference number 101a and the changed list of the change descriptors is denoted with a reference number 102a.

The starting point of the auxiliary process is the copy 114, or a sufficient partial copy, of the momentary state of the operative process. The auxiliary process comprises requesting the functional entities of the device to report their configurations prevailing at the update time instant, i.e. at the time instant corresponding to the copy 114. The auxiliary process comprises constructing an auxiliary configuration data structure 101b at least partly on the basis of the information reported by the functional entities. In the exemplifying case illustrated in FIG. 1, the auxiliary configuration data structure 101b comprises a base portion 104a that corresponds to the base portion 104 and the change descriptors 102. In FIG. 1, the constructing the auxiliary configuration data structure 101b is depicted with an arrow 112. The configuration data structure 101a, which is the most recent form of the configuration data structure in the operative process, is updated by replacing a portion 103 corresponding to the update time instant with the auxiliary configuration data structure 101b. In FIG. 1, the updating the configuration data structure 101a is depicted with arrows 113 and 115. The updated configuration data structure 101c comprises the base portion 104a of the auxiliary configuration data structure 101b and the change descriptors +C6 and −C3 indicative of the changes made after the update time instant. After the configuration data structure has been updated, the auxiliary process is terminated. The termination of the auxiliary process is depicted with an arrow 116.

Figure 2:
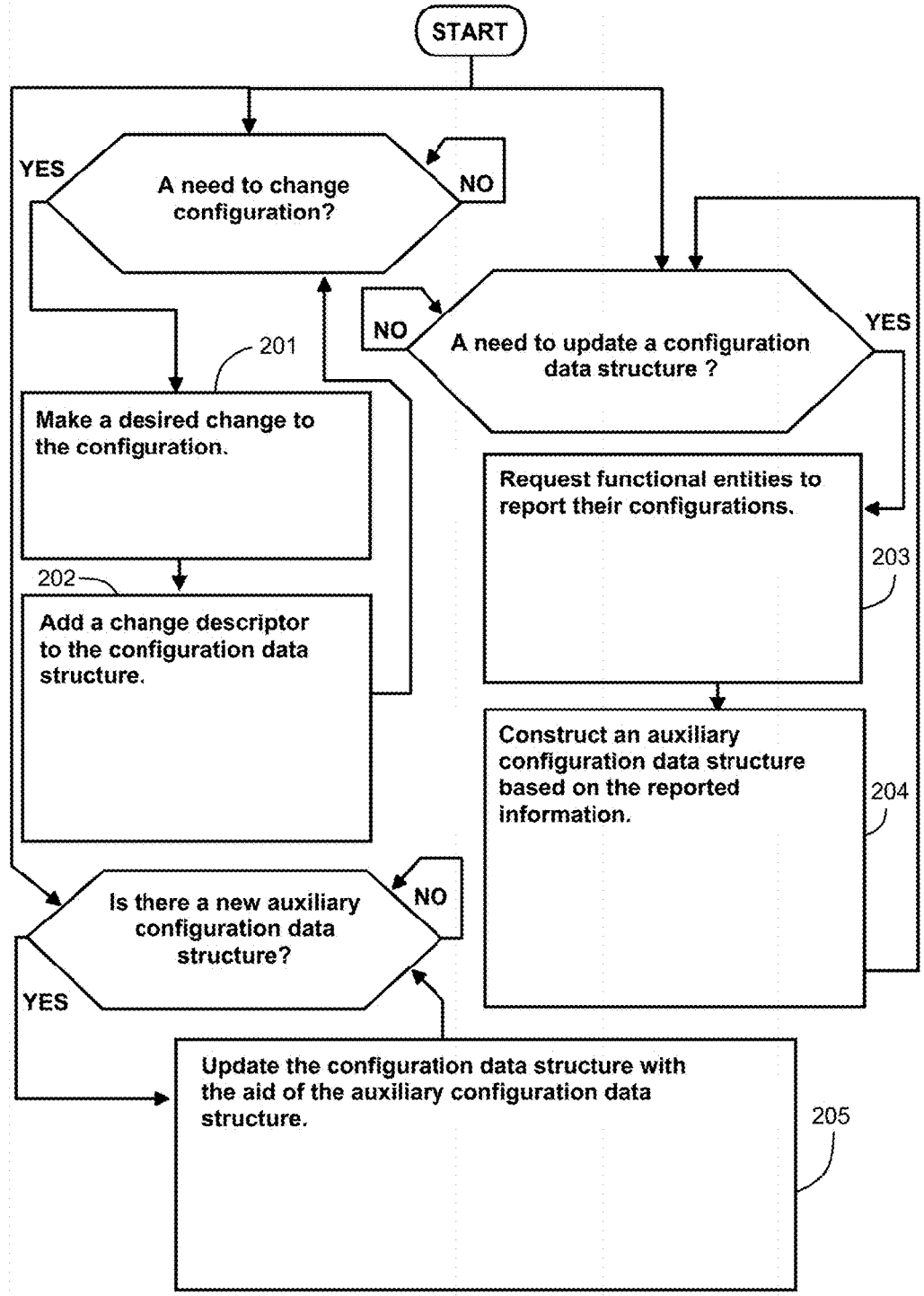
FIG. 2 shows a flowchart of a method according to an exemplifying and non-limiting embodiment of the invention for maintaining a configuration data structure.

FIG. 2 shows a flowchart of a method according to an exemplifying and non-limiting embodiment of the invention for maintaining a configuration data structure of a device, e.g. a network element. The method comprises running an operative process that comprises making 201 desired changes to the configuration of the device and adding 202, to the configuration data structure, change descriptors indicative of the changes. The method further comprises:
running, in response to a need to update the configuration data structure, an auxiliary process in parallel with the operative process, and
updating 205 the configuration data structure by replacing a portion of the configuration data structure corresponding to an update time instant with an auxiliary configuration data structure constructed by the auxiliary process, the updated configuration data structure comprising the auxiliary configuration data structure and the change descriptors indicative of the changes made after the update time instant.

The auxiliary process comprises the following actions:
action 203: requesting one or more functional entities of the device to report configurations of the functional entities prevailing at the update time instant, and
action 204: constructing the auxiliary configuration data structure at least partly on the basis of the information reported by the functional entities.

A method according to an exemplifying and non-limiting embodiment of the invention comprises starting the auxiliary process in response to a situation in which the amount of the change descriptors exceeds a pre-determined limit, i.e. the list of the change descriptors has become inconveniently long.

As illustrated in FIG. 1, the auxiliary process is initialized so that the data used in the auxiliary process and defining at least the configurations of the functional entities prevailing at the update time instant equals to the corresponding data used in the operative process.

In a method according to an exemplifying and non-limiting embodiment of the invention, the auxiliary process is initialized so that the method comprises copying, from first memory areas of the device to second memory areas of the device, the data defining at least the configurations of the functional entities prevailing at the above-mentioned update time instant. The data contained by the first memory areas is used in the operative process, and changes needed by the operative process are written to these first memory areas. Correspondingly, the data contained by the second memory areas is used in the auxiliary process, and changes needed by the auxiliary process are written to these second memory areas. An inherent drawback of this approach where the whole data needed for the auxiliary process is copied from the above-mentioned first memory areas to the second memory areas is that the required memory capacity for the auxiliary process is about the same as the memory capacity needed for the operative process.

In a method according to an exemplifying and non-limiting embodiment of the invention, the auxiliary process is initialized to use the same data that is used by the operative process and that is contained by first memory areas of the device. In a case where one of the operational and auxiliary processes needs a given piece of the data in a first form and the other one of the operational and auxiliary processes needs this piece of the data in a second form different from the first form, the method comprises storing the first form of the piece of the data in one of the first memory areas and the second form of the piece of the data in one of second memory areas that are different from the first memory areas. The first form of the piece of the data can be e.g. the original piece of the data and the second form of the piece of the data can be a modification of the piece of the data, or the first form of the piece of the data can be a modification of the piece of the data and the second form of the piece of the data can be the original piece of the data, or the first and second forms can be mutually different modifications of the piece of the data. In this approach, the forking of the operative process into the mutually parallel operative and auxiliary processes does not usually require significant memory capacity because the second memory areas are needed only when the mutually parallel operative and auxiliary processes need pieces of the data in mutually different forms. This principle is known as the Copy-on-write "COW" approach.

The above-described COW-approach can be implemented in a virtual memory space so that the mutually parallel operative and auxiliary processes refer to same physical memory areas and the operating system "OS" can use the memory management unit "MMU" for directing write actions to different physical memory areas when differences occurs between the operative and auxiliary processes. In this case, the method comprises controlling the operative process to use a first virtual memory space and controlling the auxiliary process to use a second virtual memory space. Both the first and second virtual memory spaces are mapped, at the update time instant, to first memory areas which contain the data defining at least the configurations of the functional entities prevailing at the update time instant. In a case where one of the operational and auxiliary processes needs a given piece of the data in a first form and the other one of the operational and auxiliary processes needs this piece of the data in a second form, the method comprises changing mapping of one of i) a virtual memory area of the first virtual memory space and ii) a virtual memory area of the second virtual memory space from one of the first memory areas to one of second memory areas. In other words, the mappings of mutually corresponding virtual memory areas of the first and second virtual memory spaces are diverged at least when the operational and auxiliary processes need mutually different forms of a piece of the data that is related to these virtual memory areas according to the original mappings.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying embodiment of the invention comprises software modules for maintaining a configuration data structure expressing configuration of a device. The software modules comprise computer executable instructions for controlling a programmable processing system to:

run an operative process that comprises making changes to the configuration of the device and adding, to the configuration data structure, change descriptors indicative of the changes, run, in response to a need to update the configuration data structure, an auxiliary process in parallel with the operative process, and update the configuration data structure by replacing a portion of the configuration data structure corresponding to an update time instant with an auxiliary configuration data structure constructed by the auxiliary process, the updated configuration data structure comprising the auxiliary configuration data structure and the change descriptors indicative of the changes made after the update time instant The auxiliary process comprises:

requesting one or more functional entities of the device to report configurations of the functional entities prevailing at the update time instant, and constructing the auxiliary configuration data structure at least partly on the basis of the information reported by the functional entities.

The software modules can be e.g. subroutines or functions implemented with a suitable programming language and with a compiler suitable for the programming language and for the programmable processing system under consideration. It is worth noting that also a source code corresponding to a suitable programming language represents the computer executable software modules because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with a computer program according to an exemplifying embodiment of invention.

A signal according to an exemplifying and non-limiting embodiment of the invention is encoded to carry information defining a computer program according to an exemplifying embodiment of invention.

Figure 3:
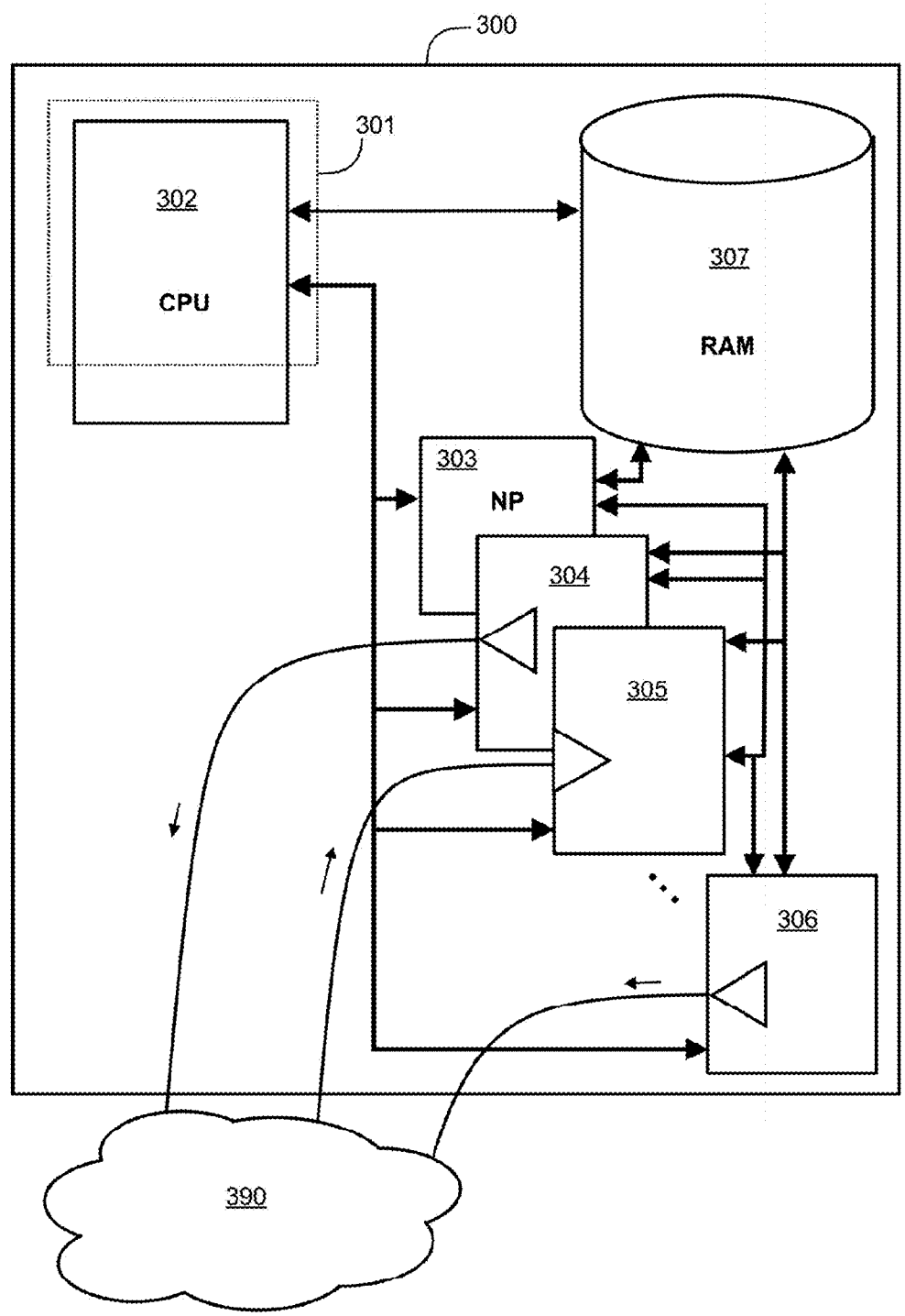
FIG. 3 shows a schematic illustration of a network element comprising an appliance according to an exemplifying and non-limiting embodiment of the invention for maintaining a configuration data structure of the network element.

FIG. 3 shows a schematic illustration of a network element 300 according to an exemplifying and non-limiting embodiment of the invention. The network element can be for example an Internet Protocol "IP" router, an Ethernet switch, a multiprotocol label switching "MPLS" switch, a network element for a software defined network "SDN", an Asynchronous Transfer Mode "ATM" switch, and/or a packet optical switch. The network element comprises network interfaces for transmitting data to a data transfer network 390 and network interfaces for receiving data from the data transfer network. In FIG. 3, two of the network interfaces for transmitting data are denoted with reference numbers 304 and 306, and one of the network interfaces for receiving data is denoted with a reference number 305. In this exemplifying and non-limiting case, the network element comprises a network processor "NP" 303 for running data transfer protocols being used, e.g. IP, the Transmission Control Protocol "TCP", Ethernet, ATM, and/or MPLS. It is also possible that the data transfer protocols are run by one or more programmable processor circuits provided with appropriate software, and/or one or more dedicated hardware processors such as for example an application specific integrated circuit "ASIC", and/or one or more configurable hardware processors such as for example a field programmable gate array "FPGA". The above-mentioned network interfaces and the network processor represent functional entities for controlling and carrying out data transfer between the network element and the data transfer network 390. Furthermore, the functional entities may comprise immaterial entities such as e.g. software implemented processes. For further example, the functional entities may comprise shapers, schedulers, physical or logical egress ports, physical or logical ingress ports, forwarding tables, access control lists, routing protocol parameters, border gateway protocol "BGP" peers, etc. The network element comprises a memory 307 for buffering data to be forwarded and for storing other data. The memory 307 can be implemented with one or more memory devices such as for example one or more random access memory "RAM" circuits. The network element comprises a processing system 302 communicatively connected to the memory 307, to the network processor 303, and to the network interfaces 304-306. The processing system 302 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA".

The processing system 302 is configured to constitute an appliance 301 for maintaining a configuration data structure expressing configuration of the network element. It is worth noting that the processing system 302 has typically many other tasks in addition to the maintenance of the above-mentioned configuration data structure. The processing system 302 is configured to constitute the appliance 301 so that the appliance comprises means for running an operative process that comprises making changes to the configuration of the network element and adding, to the configuration data structure, change descriptors indicative of the changes. The appliance 301 further comprises:

means for running, in response to a need to update the configuration data structure, an auxiliary process in parallel with the operative process, and means for updating the configuration data structure by replacing a portion of the configuration data structure corresponding to an update time instant with an auxiliary configuration data structure constructed by the auxiliary process.

The means for running the auxiliary process comprise:

means for requesting the functional entities of the network element to report configurations of the functional entities prevailing at the update time instant, and means for constructing the auxiliary configuration data structure at least partly on the basis of information reported by the functional entities.

The updated configuration data structure comprises the above-mentioned auxiliary configuration data structure and the change descriptors indicative of changes made after the above-mentioned update time instant.

In a network element according to an exemplifying and non-limiting embodiment of the invention, the processing system 302 is configured to initialize the auxiliary process so that data used in the auxiliary process and defining at least the configurations of the functional entities prevailing at the update time instant equals to the corresponding data used in the operative process.

In a network element according to an exemplifying and non-limiting embodiment of the invention, the processing system 302 is configured to:

copy, from first memory areas of the memory 307 to second memory areas of the memory, the data defining at least the configurations of the functional entities prevailing at the update time instant, use, for the operative process, the data contained by the first memory areas and change the data in accordance with the operative process, and use, for the auxiliary processes, the copied data contained by the second memory areas and change the copied data in accordance with the auxiliary process.

In a network element according to an exemplifying and non-limiting embodiment of the invention, the processing system 302 is configured to:

use, for both the operational and auxiliary processes, the data contained by first memory areas of the memory 307 and defining at least the configurations of the functional entities prevailing at the update time instant, store a first form of a piece of the data in one of the first memory areas and a second form of the piece of the data in one of second memory areas different from the first memory areas in response to a situation in which a) at least one of the first and second forms of the piece of the data is a modification of the piece of the data so that the first and second forms of the piece of the data are mutually different, b) one of the operational and auxiliary processes needs the first form of the piece of the data, and c) another one of the operational and auxiliary processes needs the second form of the piece of the data.

In a network element according to an exemplifying and non-limiting embodiment of the invention, the processing system 302 is configured to control the operative process to use a first virtual memory space and to control the auxiliary process to use a second virtual memory space. Both the first and second virtual memory spaces are mapped, at the update time instant, to the above-mentioned first memory areas.

In a network element according to an exemplifying and non-limiting embodiment of the invention, the processing system 302 is configured to change mapping of one of i) a virtual memory area of the first virtual memory space and ii) a virtual memory area of the second virtual memory space from the one of the first memory areas to the one of the second memory areas in response to the above-mentioned situation in which a) the at least one of the first and second forms of the piece of the data is the modification of the piece of the data so that the first and second forms of the piece of the data are mutually different, b) the one of the operational and auxiliary processes needs the first form of the piece of the data, and c) the other one of the operational and auxiliary processes needs the second form of the piece of the data.

In a network element according to an exemplifying and non-limiting embodiment of the invention, the processing system 302 is configured to start the auxiliary process in response to a situation in which amount of the change descriptors exceeds a pre-determined limit.

The specific examples provided in the description given above should not be construed as limiting the scope and/or the applicability of the appended claims. Lists and groups of examples provided in the description given above are not exhaustive unless otherwise explicitly stated.

What is claimed is:

1. An appliance for maintaining a configuration data structure expressing configuration of a device, the appliance comprising a processing system for running an operative process comprising making changes to the configuration of the device and for adding, to the configuration data structure, change descriptors indicative of the changes, wherein the processing system is configured to:

run, in response to a need to update the configuration data structure, an auxiliary process in parallel with the operative process, and update the configuration data structure by replacing a portion of the configuration data structure corresponding to an update time instant with an auxiliary configuration data structure constructed by the auxiliary process, the updated configuration data structure comprising the auxiliary configuration data structure and the change descriptors indicative of changes made after the update time instant, wherein the auxiliary process comprises:

requesting one or more functional entities of the device to report configurations of the functional entities prevailing at the update time instant, and constructing the auxiliary configuration data structure at least partly on the basis of information reported by the functional entities.

2. An appliance according to claim 1, wherein the processing system is configured to initialize the auxiliary process so that data used for the auxiliary process and defining at least the configurations of the functional entities prevailing at the update time instant equals to data used for the operative process and defining at least the configurations of the functional entities prevailing at the update time instant.

3. An appliance according to claim 1, wherein the processing system is configured to:

copy, from first memory areas of the device to second memory areas of the device, data defining at least the configurations of the functional entities prevailing at the update time instant, use, for the operative process, the data contained by the first memory areas and change the data in accordance with the operative process, and use, for the auxiliary processes, the copied data contained by the second memory areas and change the copied data in accordance with the auxiliary process.

4. An appliance according to claim 1, wherein the processing system is configured to:
  use, for both the operational and auxiliary processes, data contained by first memory areas of the device and defining at least the configurations of the functional entities prevailing at the update time instant, and
  store a first form of a piece of the data in one of the first memory areas and a second form of the piece of the data in one of second memory areas different from the first memory areas in response to a situation in which a) at least one of the first and second forms of the piece of the data is a modification of the piece of the data so that the first and second forms of the piece of the data are mutually different, b) one of the operational and auxiliary processes needs the first form of the piece of the data, and c) another one of the operational and auxiliary processes needs the second form of the piece of the data.

5. An appliance according to claim 4, wherein the processing system is configured to control the operative process to use a first virtual memory space and to control the auxiliary process to use a second virtual memory space, both the first and second virtual memory spaces being mapped, at the update time instant, to the first memory areas.

6. An appliance according to claim 5, wherein the processing system is configured to change mapping of one of i) a virtual memory area of the first virtual memory space and ii) a virtual memory area of the second virtual memory space from the one of the first memory areas to the one of the second memory areas in response to the situation in which a) the at least one of the first and second forms of the piece of the data is the modification of the piece of the data so that the first and second forms of the piece of the data are mutually different, b) the one of the operational and auxiliary processes needs the first form of the piece of the data, and c) the other one of the operational and auxiliary processes needs the second form of the piece of the data.

7. An appliance according to claim 1, wherein the processing system is configured to start the auxiliary process in response to a situation in which amount of the change descriptors exceeds a pre-determined limit.

8. A network element comprising:
  one or more functional entities for controlling and carrying out data transfer between the network element and a data transfer network, and
  a processing system communicatively connected to the one or more functional entities,
wherein the processing system is configured to maintain a configuration data structure expressing configuration of the network element, to run an operative process comprising making changes to the configuration of the network element, and to add, to the configuration data structure, change descriptors indicative of the changes, the processing system being further configured to:
  run, in response to a need to update the configuration data structure, an auxiliary process in parallel with the operative process, and
  update the configuration data structure by replacing a portion of the configuration data structure corresponding to an update time instant with an auxiliary configuration data structure constructed by the auxiliary process, the updated configuration data structure comprising the auxiliary configuration data structure and the change descriptors indicative of changes made after the update time instant, and the auxiliary process comprising:
    requesting one or more functional entities of the device to report configurations of the functional entities prevailing at the update time instant, and
    constructing the auxiliary configuration data structure at least partly on the basis of information reported by the functional entities.

9. A network element according to claim 8, wherein each of the functional entities is one of the following: a shaper, a scheduler, an egress port, an ingress port, a forwarding table, an access control list, a software implemented process, routing protocol parameters, border gateway protocol "BGP" peers.

10. A network element according to claim 8, wherein the network element is at least one of the following: an Internet Protocol (IP) router, an Ethernet switch, a multiprotocol label switching (MPLS) switch, a network element for a software defined network (SDN), an Asynchronous Transfer Mode (ATM) switch, a packet optical switch.

11. A method for maintaining a configuration data structure expressing configuration of a device, the method comprising:
  running an operative process comprising: making changes to the configuration of the device and adding, to the configuration data structure, change descriptors indicative of the changes,
  running, in response to a need to update the configuration data structure, an auxiliary process in parallel with the operative process, and
  updating the configuration data structure by replacing a portion of the configuration data structure corresponding to an update time instant with an auxiliary configuration data structure constructed by the auxiliary process, the updated configuration data structure comprising the auxiliary configuration data structure and the change descriptors indicative of changes made after the update time instant,
wherein the auxiliary process comprises:
  requesting one or more functional entities of the device to report configurations of the functional entities prevailing at the update time instant, and
  constructing the auxiliary configuration data structure at least partly on the basis of information reported by the functional entities.

12. A method according to claim 11, wherein the method comprises initializing the auxiliary process so that data used for the auxiliary process and defining at least the configurations of the functional entities prevailing at the update time instant equals to data used for the operative process and defining at least the configurations of the functional entities prevailing at the update time instant.

13. A method according to claim 11, wherein the method comprises:
  copying, from first memory areas of the device to second memory areas of the device, data defining at least the configurations of the functional entities prevailing at the update time instant,
  using, for the operative process, the data contained by the first memory areas and changing the data in accordance with the operative process, and
  using, for the auxiliary processes, the copied data contained by the second memory areas and changing the copied data in accordance with the auxiliary process.

14. A method according to claim 11, wherein the method comprises:
  using, for both the operational and auxiliary processes, data contained by first memory areas of the device and defining at least the configurations of the functional entities prevailing at the update time instant, and storing a first form of a piece of the data in one of the first memory areas and a second form of the piece of the data in one of second memory areas different from the first memory areas in response to a situation in which a) at least one of the first and second forms of the piece of the data is a modification of the piece of the data so that the first and second forms of the piece of the data are mutually different, b) one of the operational and auxiliary processes needs the first form of the piece of the data, and c) another one of the operational and auxiliary processes needs the second form of the piece of the data.

15. A method according to claim 14, wherein the method comprises controlling the operative process to use a first virtual memory space and controlling the auxiliary process to use a second virtual memory space, both the first and second virtual memory spaces being mapped, at the update time instant, to the first memory areas.

16. A method according to claim 15, wherein the method comprises changing mapping of one of i) a virtual memory area of the first virtual memory space and ii) a virtual memory area of the second virtual memory space from the one of the first memory areas to the one of the second memory areas in response to the situation in which a) the at least one of the first and second forms of the piece of the data is the modification of the piece of the data so that the first and second forms of the piece of the data are mutually different, b) the one of the operational and auxiliary processes needs the first form of the piece of the data, and c) the other one of the operational and auxiliary processes needs the second form of the piece of the data.

17. A method according to claim 11, wherein the method comprises starting the auxiliary process in response to a situation in which amount of the change descriptors exceeds a pre-determined limit.

18. A non-transitory computer readable medium encoded with a computer program for maintaining a configuration data structure expressing configuration of a device, the computer program comprising computer executable instructions for controlling a programmable processing system to run an operative process comprising making changes to the configuration of the device and adding, to the configuration data structure, change descriptors indicative of the changes, wherein the computer program comprises computer executable instructions for controlling the programmable processing system to:

run, in response to a need to update the configuration data structure, an auxiliary process in parallel with the operative process, and update the configuration data structure by replacing a portion of the configuration data structure corresponding to an update time instant with an auxiliary configuration data structure constructed by the auxiliary process, the updated configuration data structure comprising the auxiliary configuration data structure and the change descriptors indicative of changes made after the update time instant, wherein the auxiliary process comprises:

requesting one or more functional entities of the device to report configurations of the functional entities prevailing at the update time instant, and constructing the auxiliary configuration data structure at least partly on the basis of information reported by the functional entities.

* * * * *